United States Patent
Chen et al.

(10) Patent No.: US 10,983,501 B2
(45) Date of Patent: Apr. 20, 2021

(54) TOOL-LIFE PREDICTION SYSTEM AND METHOD THEREOF

(71) Applicant: Industrial Technology Research Institute, Hsin-Chu (TW)

(72) Inventors: Yi-Ming Chen, Taichung (TW); Chi-Cheng Lin, Taichung (TW); Shu-Chung Liao, Taichung (TW); Chen-Yu Kai, Pingtung County (TW); Ta-Jen Peng, Taichung (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 180 days.

(21) Appl. No.: 16/381,738

(22) Filed: Apr. 11, 2019

(65) Prior Publication Data
US 2020/0209831 A1 Jul. 2, 2020

(30) Foreign Application Priority Data
Jan. 2, 2019 (TW) .................. 108100008

(51) Int. Cl.
*G05B 19/4065* (2006.01)
*G06N 3/08* (2006.01)

(52) U.S. Cl.
CPC .......... *G05B 19/4065* (2013.01); *G06N 3/08* (2013.01); *G05B 2219/50185* (2013.01)

(58) Field of Classification Search
None
See application file for complete search history.

(56) References Cited

U.S. PATENT DOCUMENTS

| | | | |
|---|---|---|---|
| 4,744,242 A | 5/1988 | Anderson et al. | |
| 5,428,556 A | 6/1995 | Torizawa et al. | |
| 5,568,028 A | 10/1996 | Uchiyama et al. | |
| 5,571,957 A | 11/1996 | Tanaka | |
| 2015/0243108 A1* | 8/2015 | Nakayama ....... | G05B 19/41875 702/81 |
| 2016/0091393 A1* | 3/2016 | Liao .................. | B23Q 17/0995 702/34 |
| 2017/0293862 A1 | 10/2017 | Kamiya et al. | |

(Continued)

FOREIGN PATENT DOCUMENTS

| | | |
|---|---|---|
| CN | 101540009 A | 9/2009 |
| CN | 102073300 A | 5/2011 |
| CN | 102091972 A | 6/2011 |

(Continued)

OTHER PUBLICATIONS

TW OA dated Oct. 14, 2019.
CN OA dated Dec. 2, 2020.

Primary Examiner — Paul B Yanchus, III
(74) Attorney, Agent, or Firm — WPAT, PC

(57) ABSTRACT

A tool-life prediction method, applicable to a machine tool having a machining end, includes steps of capturing a plurality of measurement data from a tool of the machining end, transforming each of the plurality of measurement data into a corresponding complex process capability index (Cpk), utilizing an artificial neural network being trained to generate a tool-life prediction scale with respect to the Cpk, and then based on the tool-life prediction scale to determine a remaining tool life of the tool. In addition, a tool life prediction system is also provided.

4 Claims, 4 Drawing Sheets

(56) References Cited

U.S. PATENT DOCUMENTS

2018/0181105 A1* 6/2018 Shindou ............. B23Q 17/0995
2019/0369598 A1* 12/2019 Kubo ..................... G06N 7/005

FOREIGN PATENT DOCUMENTS

| | | |
|---|---|---|
| CN | 106778010 | 5/2017 |
| CN | 108009691 A | 5/2018 |
| CN | 108107838 | 6/2018 |
| CN | 108536938 A | 9/2018 |
| CN | 108942409 A | 12/2018 |
| CN | 109048492 A | 12/2018 |
| JP | H11267949 A | 10/1999 |
| TW | 440779 | 6/2001 |
| TW | I422460 | 1/2014 |
| TW | 201834784 A | 10/2018 |

* cited by examiner

TOOL-LIFE PREDICTION SYSTEM AND METHOD THEREOF

CROSS REFERENCE TO RELATED APPLICATION

This patent application claims the benefit of Taiwan application Ser. No. 108100008 filed on Jan. 2, 2019, the disclosures of which are incorporated by references herein in its entirety.

TECHNICAL FIELD

The present disclosure relates in general to a tool-life prediction system and a method thereof that perform analysis through manufacturing capability.

BACKGROUND

In various manufacturing processes, tools play important parts thereamong. Applications of tools, prediction of tool life or some other managements of tools form important factors to reduce production cost and time.

Currently, some machine tools include versatile sensors for detecting temperatures, vibrations, and/or displacements, so as thereby to monitor operations of the machine tools. However, it is always a hot issue to develop a method that can transmit data collected by the sensors to corresponding machining platforms so as to improve the machining performance, increase the machining efficiency, better the cutting lines and enhance the geometric accuracy of the workpiece.

In the art, a method is provided to confirm abrasion of the cutting tool by monitoring a ratio of total energy of an oscillation band within a high-frequency range to another total energy of another oscillation band within a low-frequency range. Another method is also developed to determine an instant state of the cutting tool by evaluating the actual loading torque of a spindle during the machining and the abrasion of the corresponding cutting tool. However, the aforesaid conventional methods can only collect dimensional changes of the cutting tool during the machining, loading variations of the spindle, or torque information. Thus, a user can be informed upon when abnormality in tooling dimension or spindle torque is met. Hence, in the art, the conventional methods can provide only an acknowledgement of tooling state, not a prediction of a tool life or cycles left for the instant tool. Further, in the art, a cutting test can be setup to provide information regarding the tool life by evaluating the instant loading torques and the corresponding variations during the test. Yet, an instant or real-time prediction for the tool life left for further machining jobs is still in vain. In addition, reliable tool-life information through such a test can be obtained only through a huge number of experiments, and is only useful for a single setup machining event. In particular, to light-duty or constant-loading machining, the aforementioned loading torque monitoring for evaluating the remaining tool life may be ineffective.

SUMMARY

An object of the present disclosure is to provide a tool-life prediction system and a method thereof, that can transform each individual measurement data detected by an online measurement device into a corresponding complex process capability index (Cpk) data for further training an artificial neural network. Thereupon, deviations of the Cpk after each machining can be predicted, corresponding tool-life prediction scale can be obtained, and the goal of predicting the remaining tool life for the instant cutting tool can be achieved.

In this disclosure, the tool-life prediction method, applicable to a machine tool having a machining end, includes a step of capturing a plurality of measurement data from a tool of the machining end, a step of transforming each of the plurality of measurement data into a corresponding complex process capability index (Cpk), a step of utilizing an artificial neural network being trained to generate a tool-life prediction scale with respect to the Cpk, and a step of based on the tool-life prediction scale to determine a remaining tool life of the tool.

In this disclosure, the tool-life prediction system, applicable to a machine tool having a machining end, includes an online measurement device and a tool-life prediction device. The online measurement device, connected with the machine tool, is used to capture a plurality of measurement data from a tool of the machining end. The machine tool receives the plurality of measurement data transmitted from the online measurement device, and each of the plurality of measurement data is transformed into a corresponding complex process capability index (Cpk). The tool-life prediction device, connected with the machine tool, receives the Cpk transmitted from the machine tool, utilizes an artificial neural network being trained to generate a tool-life prediction scale with respect to the Cpk, and then evaluates the tool-life prediction scale to determine a remaining tool life of the tool.

As stated, by providing the tool-life prediction system and the method thereof, the measurement data detected in a real-time manner can be used to be transformed into corresponding Cpk for predicting and broadcasting a remaining tool life of the instant tool, and further a preventive tool-changing protocol is determined by evaluating the remaining tool life of the tool, such that precision deviations and tool abrasion during machining can be resolved so as to ensure manufacturing accuracy and enhance stability in the production line.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
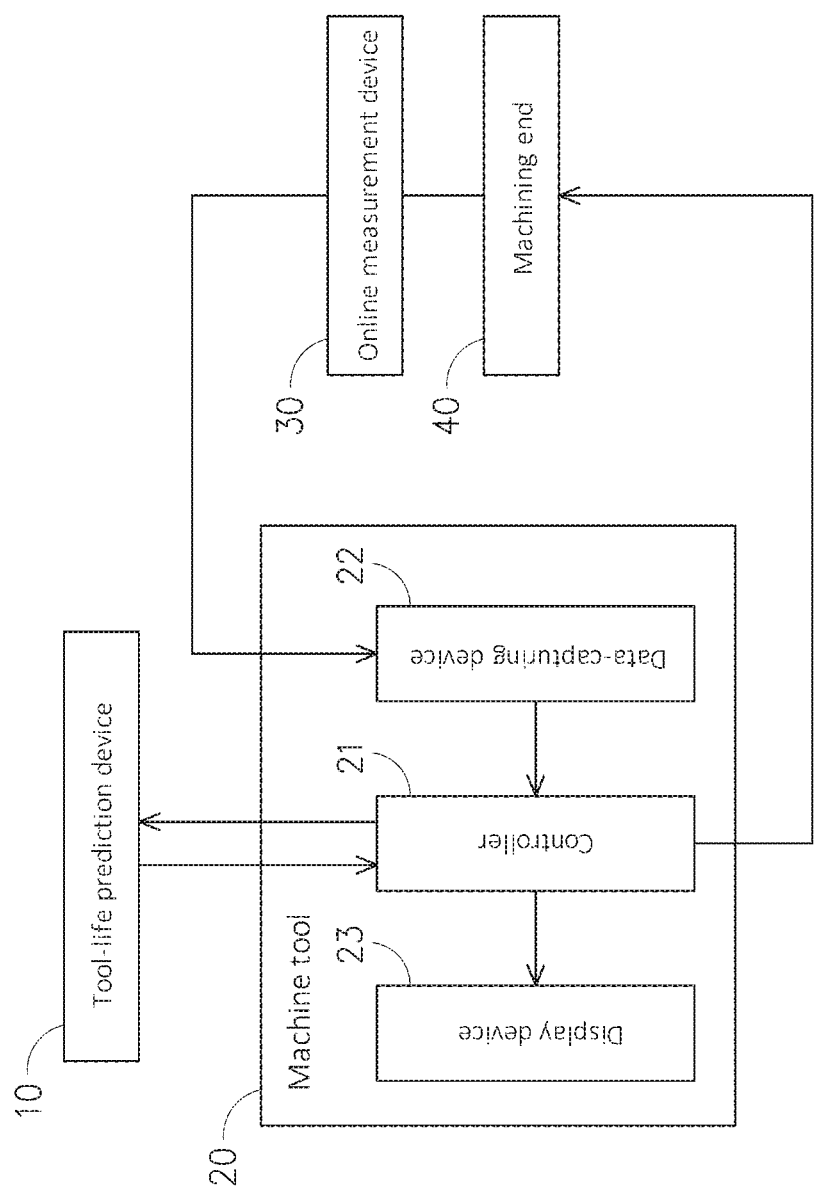
FIG. 1 is a schematic view of an embodiment of the tool-life prediction system in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Referring now to FIG. 1, a schematic view of an embodiment of the tool-life prediction system in accordance with this disclosure is shown. In this embodiment, the tool-life prediction system includes a tool-life prediction device 10 and an online measurement device 30, and the online measurement device 30 issue further connected with a machine tool 20 and a machining end 40.

In this embodiment, the machine tool 20, connected to bridge the online measurement device 30 and the machining end 40, includes at least a controller 21, a data-capturing device 22 and a display device 23. The controller 21 can be consisted of hardware (such as a processor, a computer or a mainframe), software (such as program commands for the processor), or a combination of hardware and software. The controller 21 can issue commands to the machining end 40 so as to have the tool to machine a workpiece. In this embodiment, the machining end 40 can be a spindle to hold the tool to process machining, and can be a part of the machine tool 20. The online measurement device 30 can be a probe measurement device or a laser measurement device to capture a plurality of measurement data from a tool at the machining end 40 while the tool is machining. It shall be explained that the term "measurement data" herein is directed to the dimension of the tool. Since the abrasion of the tool would increase with the increase of the machining time and could lead to deviations in the dimension of the tool, the measurement of this embodiment would be set to detect the dimension of the tool. The display device 23 can display the instant machining state, machining conditions, and/or the tool processing commands for the machining end 40 from the controller 21. In this embodiment, data to be displayed at the display device 23 can be adjusted in accordance with the practical setting of the machine tool.

In this embodiment, the data-capturing device 22 of the machine tool 20 receives each of the measurement data transmitted from the online measurement device 30, and further transforms each individual measurement data into a corresponding complex process capability index (Cpk). It shall be explained that the term "complex process capability index (Cpk)", or called as the accuracy, stands for the capability of producing quality products upon when the production is under fixed manufacturing conditions and a stable controlled environment. Namely, the Cpk can be treated as manufacturing capability of a product (such as the tool in this embodiment) that can be digitized and specified for being further used to calculate and evaluate dimensions, machining time deviations and weights of the product. In this disclosure, the complex process capability index (Cpk) is consisted of a capability index of process precision (Cp) and a capability index of accuracy (Ck). In other words, the complex process capability index (Cpk) is a manufacturing capability index to summarize the capability index of process precision (Cp) and the capability index of accuracy (Ck). The capability index of accuracy (Ck), the capability index of process precision (Cp) and the complex process capability index (Cpk) can be represented by the following mathematical expression (1), mathematical expression (2) and mathematical expression (3), respectively.

$$Ck=(M-X)/(T/2) \qquad (1);$$

$$Cp=T/6\sigma \qquad (2);$$

$$Cpk=Cp\times(1-Ck) \qquad (3).$$

In the foregoing mathematical expression (1)~mathematical expression (3), M stands for a specification mean value (i.e., the expected mean value of manufacturing process), X stands for an average value of measurement data, T stands for a specification width (i.e., the difference of an upper and a lower specification limits). Specification Width/Tolerance=ST), and $\sigma$ stands for a standard deviation of the measurement data. In addition, in mathematical expression (1), (M-X) for Ck stands for a distance between the specification mean value and the measurement data, and (T/2) stands for a half of the specification width. Thus, the data-capturing device 22 of the machine tool 20 receives every measurement data transmitted from the online measurement device 30, and the received measurement data is transformed into corresponding Cpk according to the capability index of accuracy (Ck), the capability index of process precision (Cp) and the complex process capability index (Cpk).

In detail, from mathematical expression (1), the capability index of accuracy (Ck) is defined as a ratio of the deviation of the center position of the practical product (X) from the predetermined specification mean value (M), i.e., (M-X), to a half of the specification width (T/2). In other words, the closer the average center value of the measurement data is to the specification center, the more accurate production would be. Further, from mathematical expression (2), the Cp is defined as a ratio of the specification width (T) to the practical width (6σ) of the measurement data. By summarizing the Ck of mathematical expression (1) and Cp of mathematical expression (2), and from mathematical expression (3), it can be understood that the Cpk is defined as a multiplication of the accuracy Cp and a coefficient (1−Ck) for compensating possible bias in the Cp. In one embodiment, the (1−Ck) can have a maximum of 1 (i.e., Ck=0), and it implies that the production center (i.e., the average center value of the measurement data) falls right at the specification center. Further, the bigger the deviation between the production center and the specification center is, the smaller the (1−Ck) would be, and so is the Cpk. Namely, it implies that a poorer manufacturing capability would be. Thus, with the increase in the abrasion of the tool, the Cp and the Ck would be varied as well, and then the Cpk would be biased and shifted. If a change of the Cpk at the tool for every machining of the workpiece can be predicted, then the remaining tool life of the instant tool can be understood, and therefore a preventive tool replacement can be executed to reduce the machining errors and production loss.

In this embodiment, the tool-life prediction device 10, connected with the machine tool 20 and consisted of hardware (such as a processor, a computer or a mainframe), software (such as program commands for the processor) or a combination of hardware and software, can be treated as a remote controller 21 for the machine tool 20, or can be cabled to the machine tool 20. In this embodiment, the tool-life prediction device 10 can be a communication library mounted to the processor, the computer, the mainframe and the like hardware, and able to connect the controller 21 of the machine tool 20 via the processor, the computer, the mainframe or the like hardware to perform preset program commands in the hardware for executing tool-life prediction for the instant tool at the machine end 40, preferably through the tool-life prediction method of this disclosure.

Figure 2:
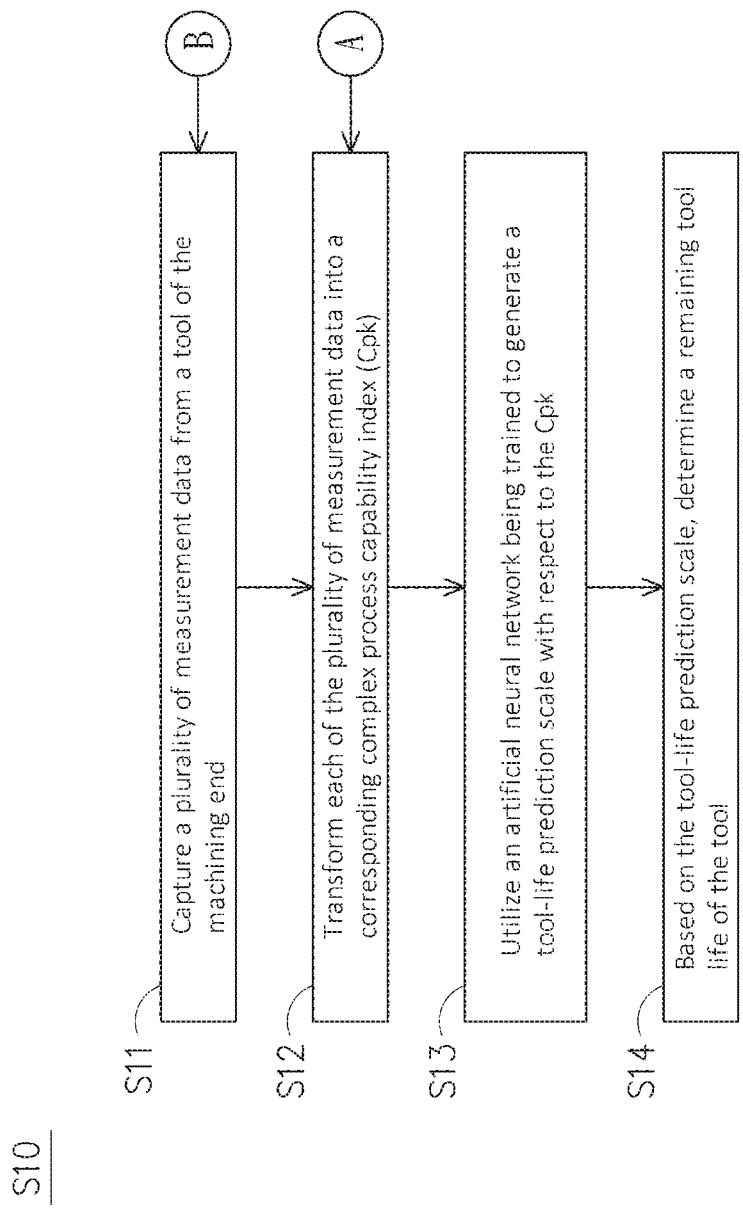
FIG. 2 is a flowchart of an embodiment of the tool-life prediction method in accordance with this disclosure.

Referring now to FIG. 2, a flowchart of an embodiment of the tool-life prediction method in accordance with this disclosure is schematically shown. In this embodiment, the tool-life prediction method S10, applicable to the tool-life prediction system of FIG. 1, includes Step S11 to Step S14 as follows.

In performing Step S11, capture a plurality of measurement data from a tool at a machining end. As shown in FIG. 1, the online measurement device 30 can be a probe measurement device or a laser measurement device. While the tool is machining a workpiece, the online measurement device 30 is introduced to capture a plurality of measurement data from the tool at the machining end 40. It shall be explained that the term "measurement data" herein is the dimension of the tool. The display device 23 can present an instant machining state, machining conditions, and/or the like, and can be adjusted in accordance with practical setting of machine tool.

In performing Step S12, each of the measurement data issue transformed into a corresponding Cpk. The data-capturing device 22 of the machine tool 20 receives every measurement data transmitted from the online measurement device 30. Further, in accordance with the aforesaid definitions of the capability index of accuracy (Ck), the capability index of process precision (Cp) and the complex process capability index (Cpk) in the aforesaid embodiment of FIG. 1, the measurement data are transformed into corresponding Cpk.

Figure 3:
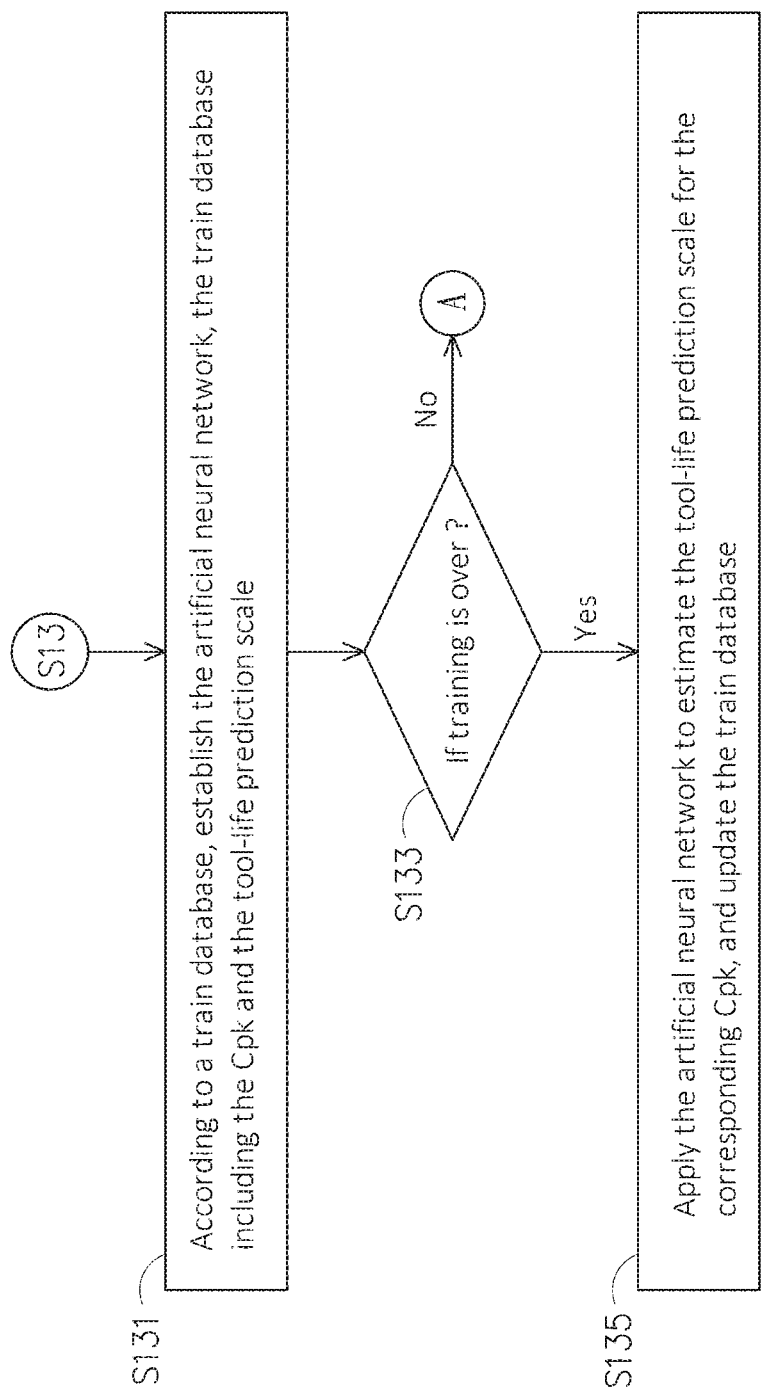
FIG. 3 is a flowchart of an embodiment to perform Step S13 of FIG. 2.

In performing Step S13, calculate a trained artificial neural network, so that each of the Cpk can generate a corresponding tool-life prediction scale. By having FIG. 1 as an example, the tool-life prediction device 10 receives every Cpk transmitted from the controller 21 of the machine tool 20, and thus each of the received Cpk can be used to generate a corresponding tool-life prediction scale though calculating a trained artificial neural network. In detail, referring now to FIG. 3, a flowchart of an embodiment to perform Step S13 of FIG. 2 is shown. As shown, Step S13 includes Step S131 to Step S135 as follows. While in performing Step S131, a train database is used to construct an artificial neural network, in which the train database includes the Cpk and the corresponding tool-life prediction scale with respect to the Cpk. In this embodiment, the online measurement device 30 provides a huge number of Cpk and the corresponding tool-life prediction scale to be the train database for predicting the tool life by adopting the recurrent neural network (RNN).

Firstly, a relationship between the Cpk of the tool and the corresponding number of remaining workable workpieces for the tool is defined as an expectation value. For example, if a state of the Cpk of the tool after continuous machining for 300 workpieces shows that the related abrasion of the tool has not met a state of a qualified Cpk, it means that a tool replacement is necessary. Thus, at this moment, the tool-life prediction scale is assigned to be 1. Then, the tool-life prediction scale is assigned to be 0.8 for a state of the Cpk of the tool after continuous machining for 250-300 workpieces, and the tool-life prediction scale is assigned to be 0.6 for a state of the Cpk of the tool after continuous machining for 200-250 workpieces. Thereupon, a train database can be established according to the aforesaid relationship between the Cpk and the tool-life prediction scale, and the train database is treated as a target output after the training.

Then, in performing Step S133, it is determined whether or not the training is finished. In this embodiment, the Cpk is treated as an input layer, in which the Cpk is obtained by transforming a plurality of measurement data upon the tool at the machining end 40 captured by the online measurement device 30. Every tool-life prediction scale can be an output layer. The Cpk can be obtained by predicting through transmission and analysis in the neural link. Thus, via training the artificial neural network so as to obtain a hidden layer, the output layer can be calculated from the input layer through the hidden layer, and the back-propagation neuron network (BPN) is adopted to train a weight in the hidden layer. In other words, the method of this embodiment trains the artificial neural network by the train database so as to find out the hidden layer; i.e., to find out a connection relationship between the Cpk and the corresponding tool-life prediction scale. In this embodiment, the weighting for the hidden layer can be trained by the following mathematical expression (4):

$$\frac{\partial E}{\partial W_{ij}} = \frac{\partial \frac{1}{2} \sum_{k=1}^{k}(D_k - \text{net}_k)}{\partial W_{ij}}. \qquad (4)$$

In mathematical expression (4), E stands for a deviation, $W_{ij}$ stands for a weighting, $D_k$ stands for a target output at the k-th neuron of the output layer, and $\text{net}_k$ stands for an expectation value. It shall be explained that the term "target output" herein is directed to the tool-life prediction scale transmitted during a practical training, and the term "expectation value" herein is directed to the relationship between the Cpk of the tool and the corresponding number of remaining workable workpieces for the tool.

For example, the tool-life prediction scale is assigned to be 1 for a state of the Cpk of the tool after continuous machining for more than 300 workpieces, the tool-life prediction scale is assigned to be 0.8 for a state of the Cpk of the tool after continuous machining for 250~300 workpieces, and the tool-life prediction scale is assigned to be 0.6 for a state of the Cpk of the tool after continuous machining for 200~250 workpieces. Through a partial differentiation of the deviation E with respect to the weighting, the tool-life prediction device 10 can receive a Cpk and output a tool-life prediction scale. By evaluating the deviation between the tool-life prediction scale and the expectation value, the weighting in the hidden layer cab be adjusted. As soon as $$\frac{\partial E}{\partial W_{ij}} = 0$$

is detected, it implies that the training is finished.

In Step S133, if the training has not finished, then go back to Stage A; i.e., to perform Step S12 of FIG. 2 for transforming each of the measurement data into the corresponding Cpk. Namely, the training of transmitting an updated Cpk continues, till the training undetermined to be finished in Step S133. On the other hand, if Step S133 determines that the training is over, then perform Step S135 to apply the artificial neural network to train and predict a corresponding tool-life prediction scale of the Cpk transformed from the measurement data, and then to update the train database. It shall be explained that the meaning of updating the train database is directed to a manipulation of using a tool with a particular specification to proceed machining after another tool with the same specification is trained, or another manipulation of using a new tool with the same specification with the trained tool. According to Step S135, an estimated tool-life prediction scale can be obtained, and the estimated tool-life prediction scale of the tool is updated to the train database. Hence, the measurement data of the online measurement device 30 and the transformed Cpk in each machining cycle are used to train the artificial neural network, to predict the deviation of the Cpk for each machining, and to obtain the corresponding tool-life prediction scale. In addition, with the training of the artificial neural network, a prediction of the number of remaining workable workpieces for the tool can be obtained.

Figure 4:
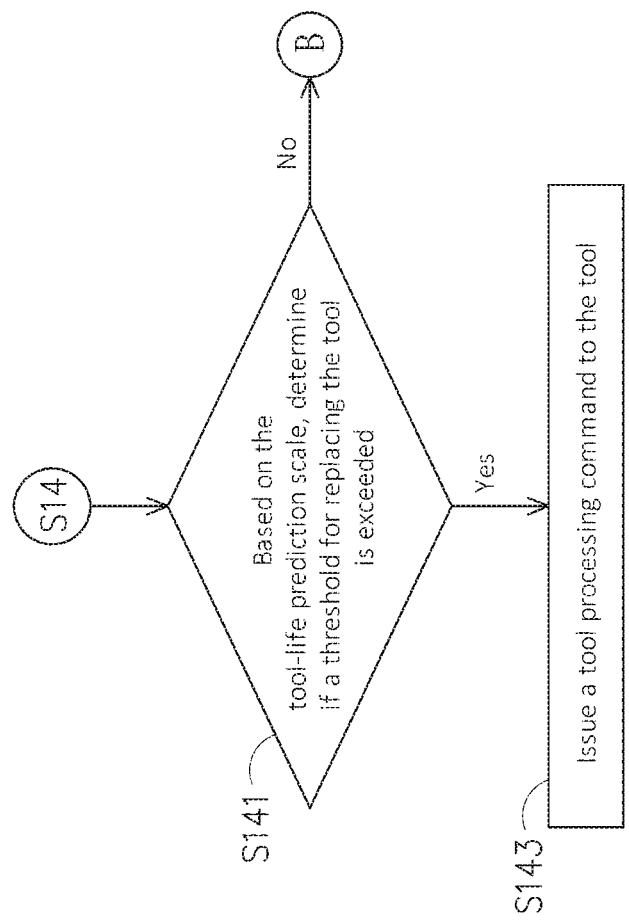
FIG. 4 is a flowchart of an embodiment to perform Step S14 of FIG. 2.

Referring back to FIG. 1, after Step S13 has been performed to generate the tool-life prediction scale with respect to the Cpk, Step S14 is now performed to determine the tool life of the tool according to the tool-life prediction scale. As shown in FIG. 4, a flowchart of an embodiment to perform Step S14 of FIG. 2 is provided. In this embodiment, Step S141 is performed to evaluate the tool-life prediction scale and thus determine whether or not a threshold for replacing the tool is exceeded. It shall be explained that the definition of "threshold for replacing the tool" is directed to an indication that the instant tool has entered a preventive range for replacing the tool before hitting an end of service life of the tool. As shown in FIG. 1, based on the tool-life prediction scale, the tool-life prediction device 10 can determine the remaining tool life of the instant tool. In the case that the service life of the tool is set to be the machining capacity of 300 workpieces. Then, the threshold for replacing the tool can be set to be the machining of 200 workpieces. In other words, after the tool is used to complete the machining of 200 workpieces, then a judgment should be made upon whether or not the instant tool shall be replaced. As described, if the tool-life prediction scale is 0.6, then it implies that the instant tool has experienced continuous machining for 200~250 workpieces; in particular, for 250 workpieces. Thus, in this situation, Step S141 would make a positive judgement, and the tool-life prediction device 10 would transmit the remaining tool life of the instant tool to the controller 21 of the machine tool 20. The controller 21 evaluates the tool-life prediction scale to issue the tool at least a tool processing command. The tool processing command can be, for example, a notice of remaining a 50-workpiece machining capacity, or an order to replace the tool. Also, the aforesaid tool processing command can be displayed on the display device 23 of the machine tool 20, so that related personals or engineers can easily evaluate if a preventive tool replacement is necessary. In other words, by defining a replacement threshold for replacing the tool, a preventive tool replacement can be thus clearly executed in time to reduce possible machining deviations and loss caused by tool abrasion.

In one embodiment, the tool-life prediction scale is smaller than 0.6. It implies that the number of workpieces machined by the instant tool is less than 200. In the case that the number of workpieces machined by the instant tool is 180, then Step S141 would make a negative judgement, and the tool-life prediction device 10 would transmit the remaining tool life of the instant tool to the controller 21 of the machine tool 20. The controller 21 evaluates the tool-life prediction scale to issue the tool at least a tool processing command. The tool processing command can be, for example, a notice of remaining a 120-workpiece machining capacity. In addition, the method would go back to Stage B for further machining; i.e., to perform Step S11 of FIG. 2 for capturing a plurality of measurement data from the tool at the machining end 40.

It shall be explained that, in all the aforesaid embodiments, only a single tool is applied to a single machine tool 20. To the tools with the same specification, the trained artificial neural network calculated in accordance with the method S10 provided by this disclosure still prevails, in which each of the Cpk is utilized to produce a corresponding tool-life prediction scale. If a tool with a different specification is used, then the artificial neural network needs to be re-trained. In another embodiment, a plurality of machine tools is proved to be still applicable to the tool-life prediction method S10 of this disclosure. The controller 21 of each of the machine tools 20 issues respective Cpk to the common tool-life prediction device 10. Then, based on individual Cpk's, the tool-life prediction device 10 derives individually corresponding artificial neural networks and train databases for respective machine tools 20. According to each of the artificial neural networks, a corresponding tool-life prediction scale with respect to the individual Cpk would be generated, and further the tool-life prediction device 10 sends each of the tool-life prediction scales to the corresponding controller 21 of the respective machine tool 20, so that a predicted remaining tool life of the respective tool can be provided to organize a preventive tool-changing protocol or scheme.

In summary, by providing the tool-life prediction system and the method thereof, the measurement data detected in a real-time manner can be used to be transformed into corresponding Cpk for predicting and broadcasting a remaining tool life of the instant tool, and further a preventive tool-changing protocol is determined by evaluating the remaining tool life of the tool, such that precision deviations and tool abrasion during machining can be resolved so as to ensure manufacturing accuracy and enhance stability in the production line.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A tool-life prediction method, applicable to a machine tool having a machining end, comprising the steps of:
   (1) capturing a plurality of measurement data from a tool of the machining end;
   (2) transforming each of the plurality of measurement data into a corresponding complex process capability index (Cpk);
   (3) utilizing an artificial neural network being trained to generate a tool-life prediction scale with respect to the Cpk, including the steps of:
      (31) establishing the artificial neural network according to a train database, wherein the train database includes the Cpk and the tool-life prediction scale;
      (32) determining whether a training for the artificial neural network has finished, adopting a recurrent neural network (RNN) when finished, and going back to perform the step (2) when the training is not yet finished; and

(33) when the training is finished, applying the artificial neural network to estimate the tool-life prediction scale for the corresponding Cpk, and updating the train database; and (4) determining a remaining tool life of the tool based on the tool-life prediction scale.

2. The tool-life prediction method of claim 1, wherein the step (4) includes the steps of:

(41) determining whether a threshold for replacing the tool is exceeded based on the tool-life prediction scale; and

(42) if the threshold is exceeded, issuing a tool processing command to the tool.

3. The tool-life prediction method of claim 2, wherein, after the step (41), if the threshold is not exceeded, then the tool-life prediction method goes back to perform the step (1).

4. The tool-life prediction method of claim 1, wherein the plurality of measurement data is a dimension of the tool.

* * * * *